UNITED STATES PATENT OFFICE.

MATHIAS HOLTZMACKER, OF NEW ORLEANS, LOUISIANA.

IMPROVEMENT IN THE PROCESSES OF TREATING MOSS.

Specification forming part of Letters Patent No. 151,879, dated June 9, 1874; application filed January 14, 1874.

*To all whom it may concern:*

Be it known that I, MATHIAS HOLTZMACKER, of New Orleans, in the parish of Orleans and State of Louisiana, have invented certain new and useful Improvements in Process for Coloring Moss; and I do hereby declare that the following is a full and exact description thereof.

The moss is taken in its crude state, or just as it is gathered, and packed in barrels containing the coloring matter, which is composed of logwood-chips, about one hundred pounds; logwood-extract, about one hundred pounds, (the latter having been first ground;) copperas, about one barrel; and vinegar of apples, about ten gallons. These ingredients are boiled together for about four hours in a suitable kettle over a quick fire, when clear water is added, in the proportion of nine parts of water to one of the coloring matter. The moss, having been packed, as before stated, is allowed to remain for about six hours, when it is taken out and arranged in piles upon a suitable floor to dry. The length of time to perfect the process depends in some measure upon the character or quality of the moss under treatment, which is readily determined by any one after a short acquaintance with the moss and its peculiar properties. Of course the proportions named may be varied to some extent without departing from my invention, though those named I have found, in practice, to be the best.

I am aware that logwood and copperas have been used in the treatment of moss, and do not, therefore, lay claim thereto; but What I do claim is—

The process herein described of curing and coloring moss by subjecting it to a saturating-bath of logwood, copperas, and vinegar of apples, prepared as described, and afterward drying the same, as set forth.

Witness my hand to the foregoing specification this 10th day of July, 1873.

MATHIAS HOLTZMACKER.

In presence of—
WM. H. SEYMOUR,
PETER J. BRAMER.